Patented Aug. 20, 1940

2,211,805

UNITED STATES PATENT OFFICE 2,211,805

MANUFACTURE OF ANHYDROUS ALUMINUM SULPHATE

William S. Wilson, Brookline, and Neil A. Sargent, Woburn, Mass., assignors, by mesne assignments, to Monsanto Chemical Company, a corporation of Delaware No Drawing. Application November 18, 1936, Serial No. 111,388

4 Claims. (Cl. 23—123)

This invention relates to the production of anhydrous aluminum sulphate from sulphuric acid and an alumina containing material.

The method of manufacture of commercial aluminum sulphate involves the reaction of bauxite, commercial aluminum hydrate, or other acid soluble aluminous materials with sulphuric acid of 50–55° Bé. strength, with the addition of water or wash liquors, so that a neutral or basic solution of aluminum sulphate results which is subsequently boiled down to a solid product. This commercial product contains from 16–18% soluble alumina, and from 40–45% $H_2O$. These neutral alum liquors may be mixed in proper proportion with alkali sulphates and subsequently crystallized to yield true alum crystals. These products are also characterized by containing a large amount of water of crystallization.

It is obvious that if this water of hydration could be satisfactorily removed from the commercial aluminum sulphate an anhydrous product would result, which would be of decided advantage to the consumer and producer. Various attempts to achieve this end have been made, as is shown by numerous patents concerning the production commercially of an aluminum sulphate containing substantially no water of crystallization or hydration.

It is a well known fact, readily determined by experiment, that the temperature of melting or solidification of commercial aluminum sulphate decreases with increasing alumina content from 15% $Al_2O_3$ to 18–19% $Al_2O_3$. Beyond this point the melting or solidification point increases with the alumina concentration. The point of minimum melting varies somewhat with varying degrees of basicity of the aluminum sulphate, and its exact location is to a certain degree indeterminate, but it exists between 18–20% $Al_2O_3$ concentration.

The existence of this "eutectic" point, or the presence of a definite hydrate of aluminum sulphate possessing a minimum melting point in the series of several hydrates which must be dehydrated in any process of rendering aluminum sulphate anhydrous is the primary cause of the difficulty in carrying out this operation.

If one attempts to dehydrate commercial aluminum sulphate by heating, it is found that the material softens up to a semi-fluid, sticky mass. Further heating will cause fluidity throughout with the exception of the top surface which is cooled to a temperature below the solidification point by evaporation. This results in the formation of a crust or film over the surface which increases the difficulty, both mechanically and thermally, of removing water vapor. This fluid, sticky melt also tends to adhere strongly to any metallic surface, and in the course of continued operation of the equipment will build up accretions of sulphate which require frequent removal; a factor of disadvantage in any commercial process, and especially so in this case where the deposited material is an extremely hard, cement-like structure.

The several Letters Patent issued for the manufacture of anhydrous aluminum sulphate are all concerned with methods for overcoming the difficulty due to the physical characteristics of the series of hydrated aluminum sulphates. One method of treatment involves spray drying, or almost instantaneous dehydration of extremely fine droplets of concentrated aluminum sulphate solution in a suitable apparatus. The main disadvantage of this type of process is that the product which results from this spray evaporation is very bulky and voluminous, so that an appreciable amount of the economic advantage gained by the dehydration is lost. Other methods which are disclosed are concerned with mechanical means for handling the semi-fluid to fluid mass which has been described. That these methods possess certain inherent disadvantages is evidenced by the fact that anhydrous aluminum sulphate is not now produced commercially to any appreciable extent, if at all.

It is well known that once having passed this $Al_2O_3$ concentration characterized by the minimum melting temperature, the increase in melting point with increasing alumina concentration is very rapid and it is possible to dehydrate the aluminum sulphate without any deleterious effects.

According to our invention we provide an economical and mechanically feasible process for the manufacture of anhydrous aluminum sulphate which is effected by directly forming a hydrated aluminum sulphate with a ratio of $Al_2O_3$ to $H_2O$ higher than that of the "minimum melting point" concentration. The procedure for accomplishing this is, up to the present time, unknown to the art.

The reaction between a hydrated oxide of aluminum, such as bauxite, commercial aluminum hydrate, or other readily decomposable aluminum ore and sulphuric acid may be expressed by the reaction:

$$Al_2(OH)_6 + 3H_2SO_4 \rightarrow Al_2(SO_4)_3 + 6H_2O$$

Since a definite quantity of water accompanies sulphuric acid of commerce, a certain amount of evaporation is required to remove sufficient water to give a ratio of $Al_2O_3$ to $H_2O$ higher than the critical value for the minimum melting point. It is well known that there is sufficient net heat of reaction available, if properly utilized, to achieve this result.

We have discovered that by mixing finely ground bauxite, commercial hydrate of alumina, or other readily decomposable aluminum ore with sulphuric acid of from 60%–100% $H_2SO_4$ content in a suitable mixer and transferring the mixture to a container holding a large quantity of the material wherein the heat of reaction may be maintained for a long time, sufficient evaporation of water takes place to obtain the desired aluminum sulphate with an $Al_2O_3$ to $H_2O$ ratio sufficiently high to allow direct dehydration without passing through the point of undesirable fluidity previously described.

We have further discovered that by a proper choice of conditions for this mixing, maximum conversion or solution of the $Al_2O_3$ contained in the raw material may be obtained in conjunction with the necessary amount of water evaporation to yield a material capable of conversion to an anhydrous product by direct or indirect heating without any undesirable effects. By combining these mixing conditions with the massing of the mixer product into a compact form which radiates or loses heat at a comparatively slow rate we have found that higher extractions of $Al_2O_3$ from bauxite are obtainable by using a theoretical quantity of acid than is possible with the usual method of dissolving aluminous material in sulphuric acid under conditions of complete liquidity.

The conditions for obtaining these results are several and are more or less interdependent.

We have found that the size of the particles of bauxite or alumina ore used is of great importance in determining the strength of acid required to obtain maximum conversion of the $Al_2O_3$ to $Al_2(SO_4)_3$. During the mixing operation we have found that a certain time of contact of fluid acid on solid ore particle is necessary. As the fineness of the particle increases this required time of contact is greatly decreased. Consequently, if a bauxite which is not ground excessively finely is used, more fluidity is required to attain an even mixing of materials, and since the rapid reaction generates heat which is dissipated by a high rate of evaporation of the water present, a weaker acid must be used. On the other hand, with exceedingly finely ground raw material the necessary contact time is so materially lowered that stronger acids may be used. We have found that the relationship of acid strength and particle size for readily decomposable alumina bearing materials is preferably of the following order:

| Ore size | Range of satisfactory acidity |
|---|---|
| 60–150 mesh | 60–70— $H_2SO_4$ |
| 100–200 mesh | 60–80— $H_2SO_4$ |
| –200 mesh | 60–100— $H_2SO_4$ |

We have determined that the mixing can be carried out in several of the types of commercial mixing machinery utilized by industry. We prefer the forms which permit rapid intermixing of liquid and solid materials, while at the same time furnishing the maximum amount of impenetration by grinding action.

The type of mixer and its size have a relationship to the strength of acid used to produce the desired results. If the mixer is so designed that the dissipation of heat by radiation, conduction or convection is higher than in another type, stronger acid is required. Furthermore, as the size of the mixing unit is increased and the ratio of heat generating capacity to heat dissipating surface is increased, a weaker acid is required to give the same time of fluid contact with the solid particles.

We have found that it is desirable to store the mixture in a compact mass to permit the completion of the reaction. During this time it will be heated by developed heat of reaction to a temperature corresponding to the boiling point of the residual free sulphuric acid, and a great deal of water will be removed by evaporation. The temperature obtained in these masses has been found to reach 180–190° C. when 66° Bé. (93%) $H_2SO_4$ is used and 130–140° C. when 60% acid is used.

This high temperature "finishing cook" furnished solely by the heat of reaction which is liberated faster than the form of the apparatus permits its dissipation, is sufficient to substantially complete the conversion of the $Al_2O_3$ of the raw material, and at the same time increases water evaporation which results in obtaining directly a hydrated aluminum sulphate of $Al_2O_3$ to $H_2O$ ratio higher than that of the "minimum melting point." This is impossible in any of the wet methods for producing aluminum sulphate.

It is not necessary to heat the sulphuric acid used, but we prefer to do so in cases where the mixing apparatus is cold and the higher temperature of the acid is desired to accelerate the heat liberating reaction or when the extraction is made on more difficultly decomposable materials.

The acid addition must be made with sufficient rapidity to maintain a thinly plastic condition until all the acid is introduced. We prefer a distributor which delivers the acid in the maximum number of fine streams over the entire surface of the solid aluminous material of the mixer.

A combination of these discoveries makes it possible for us to obtain by our process a semi-finished product containing less than 35% $H_2O$, which is the approximate $H_2O$ content of the low melting aluminum sulphate hydrate.

This product may be directly or indirectly heated to a temperature of 500° C. without any difficulty, mechanically or chemically, yielding a product containing over 27% soluble $Al_2O_3$.

The method of final calcination or dehydration may be varied to produce two different types of product. The mixing conditions may also be somewhat varied to give a desirable feed to obtain these physically different products.

In the course of our experiments, we have discovered that if a ground, hydrated aluminum sulphate of higher $Al_2O_3$ content than the composition of the minimum melting hydrate, is fed into a rotating metal cylinder maintained at a temperature slightly above the melting point, the fine powder superficially melts and combines with other particles closely adjacent. This combination coupled with the rotation of the cylinder forms rounded pellets. The evaporation of water is very rapid at this temperature and the melting point temperature rises so rapidly that the pellets form a hard dry solid substantially spherical in form without caking. This calcination is carried on with mixer material having a melting point lower than the inlet temperature of the rotary calciner. The temperature of the product on its way through the calciner is adjusted by suitable thermal control so that it is higher than the melting point of the mixer material over a sufficient space to form pellets of the desired size after which it is adjusted to be below the melting point of the hydrated aluminum sulphate. Such a temperature gradient for the product temperature in passing through a calciner may be, for example, 275°–500° C. The production of anhydrous aluminum sulphate in the form of rounded free-flowing pellets is of advantage for its use in water purification equipment.

If, on the other hand, we desire to produce a fine powder, we decrease the water content of the mixer product by using a stronger acid and thus obtain a hydrated aluminum sulphate of higher melting point. This is dehydrated in a rotary or other well known type of calciner under thermal conditions such that the product temperature will remain under the melting point at all times. Such a product temperature gradient may be 275–500° C. for its passage through the dehydrating kiln. If it is not desired to alter mixer conditions to produce two different physical products, the fine powdered form may be produced by changing the thermal balance of the furnace so that the temperature gradient of the product will remain below the melting point at all times. Such a temperature gradient could be well placed at 175–500° C.

The careful operation of our process will produce an anhydrous aluminum sulphate containing 90–94% $Al_2(SO_4)_3$. It will contain any silica, titania or undecomposed aluminous ore as insoluble matter but we find that this 3–5% of insoluble matter is not harmful when the product is used for water purification; in fact, it may have certain advantages in furnishing additional nuclei for floc formation. For this utilization exceedingly finely ground raw material need not be used to obtain a satisfactory product.

Where the product is to be used for the manufacture of paper the presence of this amount of insoluble matter might be considered a detriment. However, we have discovered that by using bauxite or similar aluminous material that has been ground to completely pass through a 200 mesh screen, with a considerable fraction smaller than 325 mesh, in our type of process, substantially complete solution of the raw material may be made, and the residual insoluble consists of a pure, white, and finely divided mixture of silica and titanium oxide, which is of advantage as a filler in paper making processes.

The use of commercial hydrated alumina, as produced by processes disclosed in the literature will by this process yield a product substantially free from iron and insoluble matter.

The following is a specific example of our process.

Bauxite ore is ground by any of the mills commonly used for the purpose, with or without mechanical size classification so that it will completely pass through a 200 mesh screen.

600 pounds of this finely ground ore are then transferred to a suitable mechanical mixer and treated with a theoretical quantity of sulphuric acid to react with all the soluble oxides contained in the raw material. This weight of acid will vary with the acidity, approximately between the limits of 1100 pounds of monohydrated (100%) $H_2SO_4$ and 1890 pounds of 60% $H_2SO_4$. The acid is distributed rapidly over the bauxite while the mixer is in operation so that at the end of the acid addition time of 2–3 minutes a thin, plastic mass is obtained. A vigorous reaction starts on the first addition of acid, accompanied by the evolution of copious quantities of steam. With strong acids the mass will become dry in one to two minutes after the acid addition has been completed. With weaker acids the mixture may become fluid or even molten. In the latter case the action may continue in the mixer until the molten mass granulates, with the accompanying evaporation of a great deal of water, or the molten mass, if mixing is considered complete, may be dumped from the mixer. Since the common types of mixers applicable to the process permit excessive dissipation of heat by other means than the evaporation of water, we prefer to keep the reacting mass in the mixer only a sufficient length of time to insure perfect intermingling of liquid and solid. This mixing cycle is usually 5–7 minutes.

The contents of the mixer are then discharged into a container capable of holding the entire mixer charge and designed to give the lowest possible heat radiating surface per unit mass of charge. The charge will rapidly heat up by means of heat liberated by the continuation of the reaction with ultimate steaming. Since there is a certain amount of waste heat available from the dehydration step of this process, these containers with the bauxite-acid mixture may well be placed in a chamber through which waste hot gas is passsed. This will permit a higher degree of dehydration than open storage in the den. However, for purposes of ordinary operation hot storage is unnecessary. The advantage gained by it is a very slight increase in alumina sulphation, more dehydration and a better and more economical over-all heat balance for the process.

The product now consists of aluminum sulphate, a small amount of unconverted aluminous material, free sulphuric acid in an amount theoretically equivalent to the unconverted ore and from 20–35% $H_2O$, depending largely on the acid strength used in the mixing operation.

The contents of the containers are cooled, then crushed and screened to yield a fine solid product of such size that it will all pass through a 40 mesh screen.

This fine, hydrated product is passed through a calciner of any of the well known types, counter-current to hot furnace or combustion gases. For the production of a fine product we prefer a temperature gradient of 150–500° C. throughout the apparatus. For the production of round pellets or free flowing granules we prefer a rotary furnace with a temperature gradient of 225–500° C., with proper adjustment of the feed and rotation rate to produce substantially round pellets of the desired size. In its passage through the kiln, a part of the free acid and undecomposed bauxite will react, thereby increasing the over-all conversion. The balance of the acid and the water of hydration will be expelled as gases, and will be discharged from the calciner admixed with the products of combustion. This acid may subsequently be collected by any of the ordinary methods employed for that purpose. A completely anhydrous aluminum sulphate is discharged from the hot end of the calcining kiln. After cooling, the product may be graded as to size by screening. In the production of pellets we prefer the separation into two sizes (4–18) mesh and (18–40) mesh. Finer material and oversize can be ground to a fine powder.

In this general description of the process it is understood that our invention is not limited to the use of any specified mechanical equipment for the mixing or dehydrating stages of the process. Material discharged from the mixer may not necessarily be placed in a container as described, for any equipment may be used which will permit massing of a large quantity of incompletely reacted constituents into a form suitable for maintaining a high temperature with minimum heat losses. The containers may be lagged to more effectively attain these ends. In the final dehydration stage of the process indirect heat may be used.

Furthermore, commercial hydrate of alumina, or other hydrated aluminum oxides occurring naturally may be used instead of bauxite and these ores may be ground more coarsely or finely than specified in the general example of our process. A hydrated oxide of alumina which has been partially dehydrated by natural or artificial means may be further processed by this method.

The globular pellets which are formed as described hereinabove are readily soluble in water, easily handled in barrels or in bulk, do not coalesce or become sticky on exposure to the atmosphere and possess a hard skin or surface, as contrasted to the interior, resulting from the incipient fluxing of the pellet during the initial dehydrating operation which gives the product a sufficient degree of hardness to resist abrasion and dusting.

We have also found that this pelleted product may be made by a modified procedure which consists in spraying a solution of aluminum sulphate on to ground anhydrous aluminum sulphate which is being agitated or rotated in a pelleting type apparatus under conditions that will produce uniform granulation, coalescing or agglomeration. The extent thereof being dependent upon the relative amounts of the anhydrous aluminum sulphate and aluminum sulphate solution added thereto. For the purpose of this operation, we have found that it is convenient to supply the anhydrous aluminum sulphate and aluminum sulphate solution continuously to a continuously discharging rotating drum (for this purpose we have used a cement mixer). The relative amount of anhydrous aluminum sulphate may be varied according to the temperature of the materials added, the amount of water which is evaporated during the operation, the concentration of the aluminum sulphate solution, intimacy of mixing and other factors. In general, when good mixing conditions are maintained, it is possible to use one part of anhydrous aluminum sulphate and from one to two parts of a hot 50 percent aluminum sulphate solution. We prefer that the product ultimately discharged from the mixer shall not have substantially more water than a hydrated aluminum sulphate having the minimum melting point, this being approximately 35% H₂O. The hydrated pelleted product so obtained is then dehydrated by the methods described hereinabove. In general, we prefer to supply the product to the dehydrator after the water of solution has been converted to water of hydration, although this is not essential. By heating the drum externally or internally the amount of anhydrous aluminum sulphate added may be reduced or even completely eliminated, since the dehydration takes place as rapidly as the water is introduced.

Although the products described herein have been referred to as hydrates, it is not altogether certain that they actually exist as such, and in fact water present therein may be in the free state. In view of this, the hydrated products referred to herein might also be described as solid hydrous products.

What we claim is:

1. In the method of preparing aluminum sulphate, the steps comprising mixing together in a mixing zone in substantially completely reactive proportions an alumina rich material of at least substantially 60 mesh fineness and sulphuric acid of at least 60% concentration sufficiently rapidly to form a fluid paste, then removing the mixture from the mixing zone while in a fluid pasty state and maintaining it under conditions which are quiescent and are adapted to avoid excessive heat losses but which permit evaporation of water while the reaction is completed, whereby the mixture sets to a solid mass in which the ratio of Al₂O₃ to H₂O is greater than that present in solid hydrous aluminum sulphate having the minimum melting point and in which the aluminum is substantially all in the form of aluminum sulphate.

2. In the method of preparing aluminum sulphate, the steps comprising mixing together in a mixing zone in substantially completely reactive proportions an alumina rich material of at least substantially 60 mesh fineness and sulfuric acid of at least 60% concentration sufficiently rapidly to form a fluid paste, removing the mixture from the mixing zone while in a fluid pasty state and maintaining it under conditions which are quiescent and are adapted to avoid excessive heat losses but which permit evaporation of water while the reaction is completed, whereby the mixture sets to a solid mass in which the ratio of Al₂O₃ to H₂O is greater than that present in solid hydrous aluminum sulphate having the minimum melting point and in which the aluminum is substantially all in the form of aluminum sulphate, and then further dehydrating this product by heating.

3. In the method of preparing aluminum sulphate, the steps comprising mixing together in a mixing zone in substantially completely reactive proportions an alumina rich material of at least substantially 60 mesh fineness and sulphuric acid of at least 60% concentration sufficiently rapidly to form a fluid paste, then passing the mixture while in a fluid pasty state into a container and maintaining it under conditions which are quiescent and which avoid excessive heat losses but which permit evaporation of water while the reaction proceeds substantially to completion, whereby the mixture sets to a solid mass in which the ratio of Al₂O₃ to H₂O is greater than that present in solid hydrous aluminum sulphate having the minimum melting point and in which the aluminum is substantially all in the form of aluminum sulphate.

4. In the method of preparing substantially anhydrous aluminum sulphate, the steps comprising mixing together in a mixing zone in substantially completely reactive proportions an alumina rich material of at least substantially 60 mesh fineness and sulfuric acid of at least 60% concentration sufficiently rapidly to form a fluid paste, then passing the mixture while in a fluid pasty state into a container and maintaining it under conditions which are quiescent and which avoid excessive heat losses but which permit evaporation of water while the reaction proceeds substantially to completion, whereby the mixture sets to a solid mass in which the ratio of Al₂O₃ to H₂O is greater than that present in solid hydrous aluminum sulphate having a minimum melting point and in which the aluminum is substantially all in the form of aluminum sulphate, crushing the thus formed solid mass, and calcining the crushed product to form substantially anhydrous aluminum sulphate.

WILLIAM S. WILSON.
NEIL A. SARGENT.